March 7, 1961
A. J. RICHARD
2,973,616
LAWN EDGER
Filed May 27, 1957
2 Sheets-Sheet 1
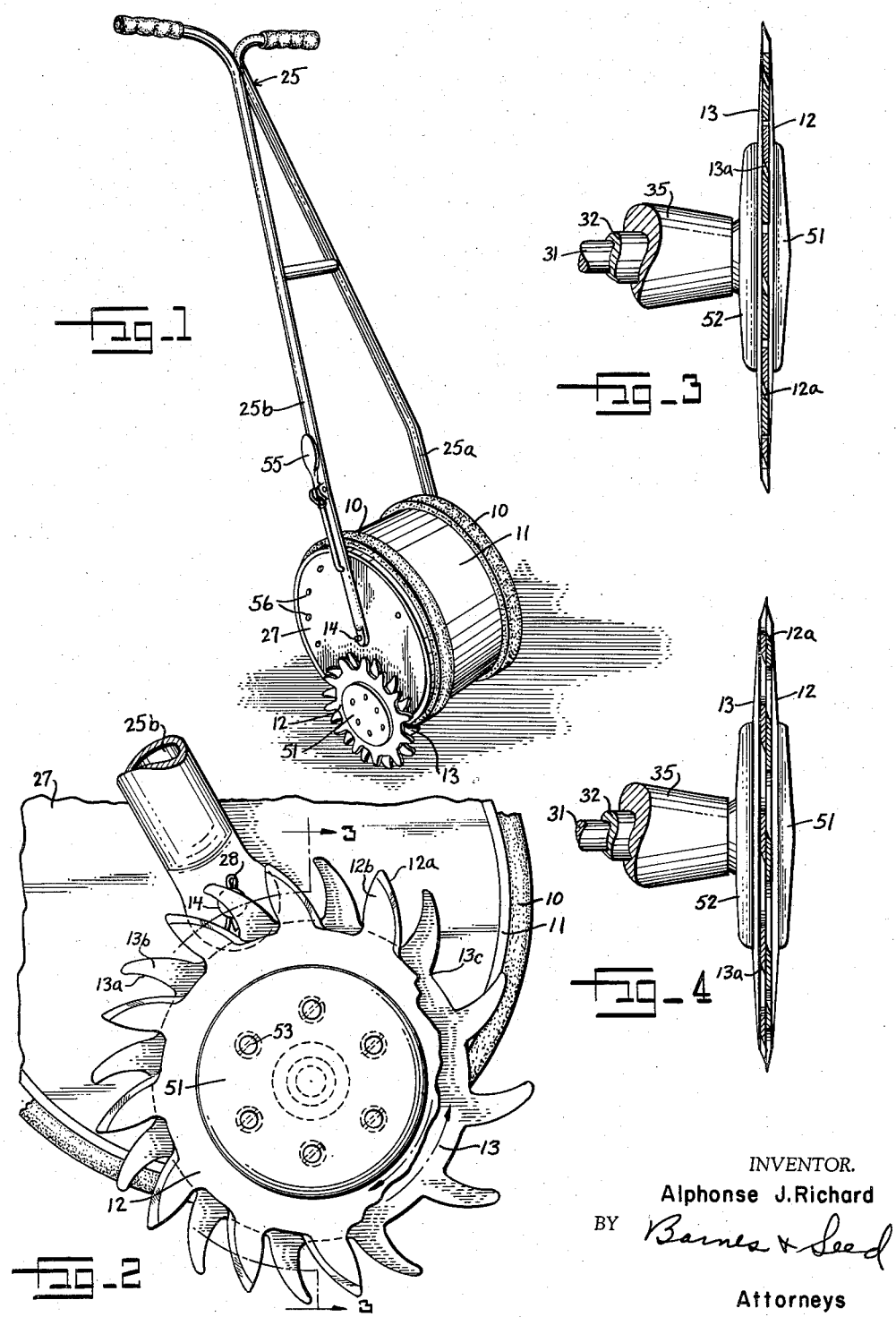
INVENTOR.
Alphonse J. Richard
BY Barnes & Seed
Attorneys

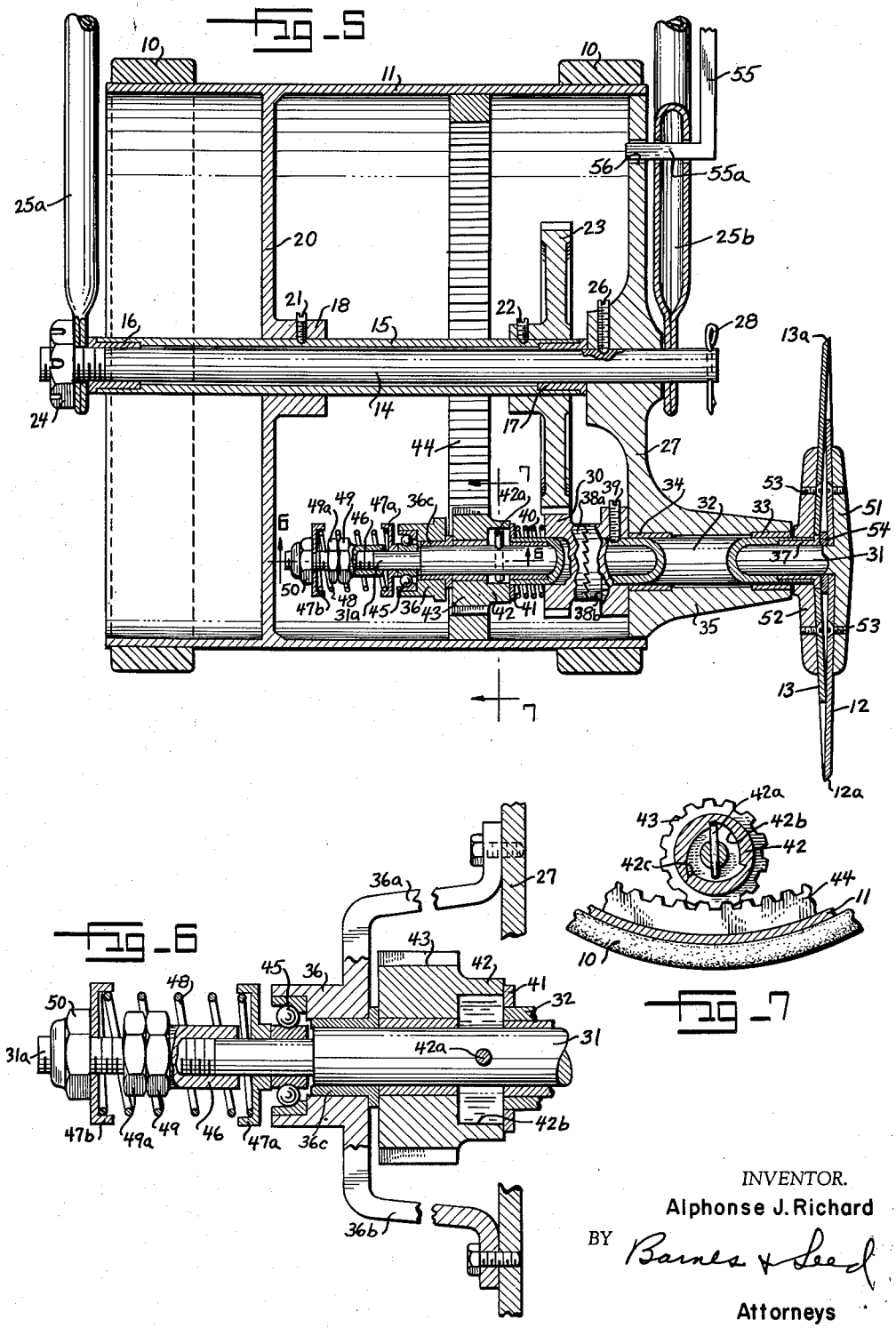

United States Patent Office 2,973,616
Patented Mar. 7, 1961

2,973,616

LAWN EDGER

Alphonse J. Richard, 8240 14th Ave. NE., Seattle, Wash.

Filed May 27, 1957, Ser. No. 661,674

3 Claims. (Cl. 56—256)

The present invention relates to an improved lawn edger in which counter-rotating toothed cutting wheels function cooperatively in response to the forward rolling of a traction wheel having a steering handle associated therewith by which the edger may be manually propelled.

As a particular object, the invention aims to provide an edger with a superior shearing or cutting action.

The invention further aims to provide an edger of the type described in which the cutting wheels are inactive when the edger is pulled in reverse.

As still another object, the invention aims to provide such an edger having its cutting wheels readily adjustable relative to the ground surface for varying the depth of cut.

Furthermore, the invention aims to provide an edger which can be manually operated with ease and expedition and at the same time is of rugged durable construction.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Figure 1 is a perspective view of my lawn edger as viewed from the cutting side thereof.

Fig. 2 is a fragmentary enlarged side elevational view of the cutting wheels.

Fig. 3 is a top plan view of the cutting wheels when their teeth are meshed, and is taken as indicated by line 3—3 of Fig. 2.

Fig. 4 corresponds to Fig. 3, but with the teeth at the close of a shearing action.

Fig. 5 is a longitudinal sectional view of the edger.

Fig. 6 is an enlarged fragmentary longitudinal sectional view taken in a generally horizontal plane and as indicated by line 6—6 of Fig. 5; and Fig. 7 is a vertical sectional view taken along line 7—7 of Fig. 5.

Referring to the drawings, it is seen that my edger tracks on a pair of tread rings 10 provided near the ends of an elongated traction wheel 11 which houses the mechanism to turn a set of peripherially-toothed cutting blades or wheels 12, 13 in counter-rotation to one another. The wheel 11 carries a center-shaft 14 which extends through a sleeve 15 and is journaled by bushings 16, 17 in the ends of the latter. This sleeve 15 is supported toward its longitudinal center in a boss 18 projecting inwardly from a hub plate 20 made rigid with the wheel 11 and spaced inwardly from one of the ends thereof. Set screws 21, 22 lock the sleeve 15 to the boss 18 and to a bevel gear 23, respectively, the latter being carried in the inner end of the sleeve. The end of shaft 14 corresponding to bushing 16 is threaded to receive a nut 24 for retaining one leg 25a of a handle 25. The other end of the shaft, after making a set screw connection 26 with a second hub plate 27, receives the other leg 25b of the handle, a cotter key 28 being used to complement the nut 24.

Gear 23 meshes with a pinion 30 which is slidably mounted on the outer of a set of telescopically associated inner and outer shafts 31, 32, respectively. The latter shaft receives journal support from a pair of bushings 33, 34 inserted in a boss 35 cast with the hub 27, while inner shaft 31 is journaled in the bushing 36c of a bearing block 36 and in bushing 37 put into the outer end of the outer shaft 32. Block 36 is carried by a pair of arms 36a–b which are removably bolted to the hub 27.

The outer end portion 38a of pinion 30 is toothed to serve as half of an overrunning clutch of the ratchet type, the other clutch half 38b being locked by a set screw 39 to the outer shaft 32. It will be seen from Fig. 5 that the ratchet teeth of this clutch are shaped to engage when the pinion 30 is turned counter-clockwise (viewed from right end) in response to forward progress of the edger and to overrun when the edger is rolled in reverse. A spring 40 urges the pinion 30 toward clutch piece 38b by one of its ends and is seated at its other end against a washer 41. This washer in turn seats against the hub of an overrunning clutch 42 provided at the corresponding end of a pinion 43 which meshes with an internal spur gear 44 secured to turn in unison with wheel 11. Pinion 43 seats against the bushing 36c and is free with respect to the inner shaft 31 except for action of the clutch 42. In this regard, as best shown in Fig. 7, clutch 42 includes a pin 42a which is slidable diametrically through the inner shaft 31. This pin works in an opening defined by three cam surfaces 42b each of which gradually increases in radius as it approaches a respective radial driving face 42c. The length of the pin 42 is such that it will be locked against one of the driving faces 42c when the pinion 43 is driven clockwise as viewed in Fig. 7 by internal gear 44 responsive to a forward pushing of the edger, but will reciprocate back and forth between the cam surfaces 42b when the pinion 43 is turned counter-clockwise due to backward pulling of the edger.

Seated in the end of the bearing block 36 facing the hub plate is the outer race of a ball-type thrust bearing unit 45. The inner shaft 31 has a threaded necked portion 31a and the inner race of the bearing 45 is sleeved on this necked portion for limited endwise play of the latter therein. To give this play the necked portion carries an elongated spacing washer 46 free to move thereon between a spring seat 47a and a nut 49 having a locknut 49a.

The spring seat 47a is urged by its related spring 48 against the inner race of bearing 45. At its other end the spring has a seat 47b which is returned by a self-locking nut 50 for varying the load on the spring. With this arrangement adjustment of the nut 49 gives the desired endwise play between the shafts 31, 32.

The cutting blades 12, 13 are secured by screws 53 to dishing hubs 51, 52 which are rigidly mounted at the ends of the shafts 31, 32 and have their opposing faces dished. Before application to these dishing hubs the cutting blades are planar, but, of course, upon being clamped against the dishing hubs, the cutting wheels assume a like dished configuration. It has been found that a 1½° bevel to the dishing hubs gives good results when the cutting wheels have a diameter of 8 inches, and in this regard, it will be noted that the bevel has been somewhat exaggerated in the drawings for illustrative purposes. Directing attention to Fig. 2 it is seen that the cutting edges 12a of the teeth 12b of the outer cutting wheel 12 are convex whereas the cutting edges 13a of the teeth 13b of the inner cutting wheel are concave. All of the cutting edges work well when their non-opposed faces are sharpened to about a 20° bevel. To discourage material working between the cutting wheels the teeth 12b of the wheel 12 desirably start at a lesser radius than defined by the root end 13c of the teeth 13b of wheel 13. Also, the hubs of the cutting wheels preferably are separated by a washer 54 of a thickness sufficient to keep the wheels proper barely out of contact with one another when their teeth are intermeshed as in Figs. 3 and 5.

To assemble my edger it is necessary to have the bearing block arms 36a–b detached from the hub plate 27 in order to pass the clutch pin 42a through the inner shaft 31 when the inner and outer shafts are telescoped together. This is perforce done after the outer shaft has been inserted through the boss 35 and the clutch piece 38b, pinion 30, spring 40, and washer 41 have been sleeved therein. Then, with the pinion 43 positioned on the inner shaft, the bearing block 36 can be introduced thereover and its arms secured to the hub plate 27. With this done and the set screw 39 tightened to lock the clutch part 38b on the outer shaft it can be seen that except by compression of spring 40, the outer shaft is held against endwise movement relative to the hub plate 27. Thus after the spring 48, its seat 47a–b, and the nuts 49, 49a and 50 have then been applied to the necked portion 31a of the inner shaft, the hub plate 27 and the inner and outer shafts with their sleeved gear and clutch parts and cutting wheels become a unitary assembly which can be introduced and locked by screw 26 to the center shaft 14. Then, with the sleeve 15 and its gear 23 locked in position in the wheel 11, the center shaft with its aforesaid assembly can be introduced through the sleeve and the eyes of the handle legs and secured in position by the nut 24.

Continuing now to an explanation of the operation of the driving mechanism of my edger, as the wheel 11 is rolled forwardly by manually pushing on the handle 25, the internal gear 44 and gear 23 will both turn clockwise therewith as viewed from the right hand end (cutting wheel end). In response to this turning of the internal gear, its pinion 43 will also be turned clockwise and by engagement of the driving faces 42c against the pin 42a will cause the inner shaft 31, and hence the cutting wheel 12, to rotate in the clockwise direction. At the same time the clockwise turning of gear 23 will turn the related pinion 30 counter-clockwise. Consequently, by action of the ratchet teeth mounted on the outer end of this pinion 30, the clutch part 38b will be locked thereto to turn the outer shaft 32 counter-clockwise. Given an equal number of teeth on the pinions 30 and 43 it can be seen that the ratio of the speeds of the inner and outer shafts will be directly proportional to the ratio of the internal gear 44 to gear 23. I have found that excellent results are achieved when the outside and inside cutting wheels turn 6:1 and 3:1, respectively, relative to the rolling speed of the wheel 11, but this is not critical. When the edger is pulled in reverse, it results in a clockwise and counter-clockwise turning, respectively, of the pinions 30 and 43, and hence in an overrunning of the related clutches so that the cutting wheels will not be powered.

The bevel of the cutting wheels causes the teeth of the cutting wheels to interfit or mesh when they are in staggered relation (Fig. 3). Then as the wheels advance further in counter-rotation, the root end portions of the cutting edges 12a of the outer wheel begin to engage the cutting edges 13a (Fig. 2) to commence a scissor-like shearing action. During this action the cutting wheels are gradually forced apart in opposition to the spring 48 as the cutting edges 12a, 13a progressively close relative to one another until their outer ends meet (Fig. 4). The play between the inner and outer shafts permitted by the adjustment of the nut 49 must of course be sufficient to permit the outer cutting wheel to move from its fully meshed position (Fig. 3) to the position corresponding to the termination of the shearing action (Fig. 4).

It will be noted from Figs. 1 and 2 that the hub plate 27 may be provided with a set of circumferentially spaced catch openings 56 for receiving the bill 55a of a spring loaded catch 55. This catch is pivotally connected intermediate its ends to the handle leg 25b. With this arrangement the outer end of the catch 55 can be depressed to free its bill 55a from the hub plate 27 and the traction wheel 11 turned relative to the handle such as to adjust the height of the rotary axis of the cutting wheels above the ground level and thereby adjust the cutting depth of the edger. The desired setting is maintained by fitting the catch bill 55a into the most adjacent opening 56.

The advantages of the invention, it is thought, will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In a lawn edger, a traction wheel having a center rotary axis, inner and outer opposed cutting wheels carried by said traction wheel and spaced outwardly from one end thereof for rotary movements about a common axis of rotation which is in spaced parallel relation to said center rotary axis and for limited relative endwise movements along said common axis, spring means operatively associated with said cutting wheels for yieldingly urging said cutting wheels toward one another, drive means operatively associated with said traction and cutting wheels for turning the cutting wheels in opposite directions in response to a turning of the traction wheel in a forward direction, and overrunning clutch means operatively associated with said drive means for inactivating said cutting wheels in response to a reverse turning of the traction wheel.

2. In a lawn edger, a traction wheel journal-mounted about a center axis on a non-rotating center shaft, a hub assembly free of said wheel and rigidly mounted on said center shaft, inner and outer concentric shafts journal-mounted for independent rotation on said hub assembly about a common axis in spaced parallel relation to said center axis and for limited relative endwise movement of said inner shaft along said common axis, two opposed cutting wheels rigidly mounted on said concentric shafts outwardly of one end of said traction wheel, spring means operatively associated with said hub assembly and inner shaft for yieldingly urging said cutting wheels together, first and second overrunning clutches operatively mounted on said inner and outer shafts, respectively, said first overrunning clutch being operative independently of the endwise position of the inner shaft relative to the outer shaft, an internally-toothed gear and an externally-tooth gear rigidly carried by said traction wheel to turn therewith in unison about said center axis, a first pinion meshing with said internally-toothed gear and operatively associated with said first overrunning clutch for driving said inner shaft responsive to a forward turning of the traction wheel, a second pinion meshing with said externally-toothed gear and operatively associated with said second overrunning clutch for driving said outer shaft in a reverse direction relative to said inner shaft responsive to said forward turning of the traction wheel, and overrunning clutches being operative to inactivate said inner and outer shafts responsive to a reverse turning of the traction wheel.

3. In a lawn edger, a traction wheel journal-mounted about a center axis on a non-rotating center shaft, a hub assembly free of said wheel and rigidly mounted on said center shaft, inner and outer concentric shafts journal-mounted for independent rotation on said hub assembly about a common axis in spaced parallel relation to said center axis, two opposed cutting wheels rigidly mounted on said concentric shafts outwardly of one end of said traction wheel, first and second overrunning clutches operatively mounted on said inner and outer shafts respectively, an internally-toothed gear and an externally-toothed gear rigidly carried by said traction wheel to turn therewith in unison about said center axis, a first pinion meshing with said internally-toothed gear and operatively associated with said first overrunning clutch for driving said inner shaft responsive to a forward turning of the traction wheel, a second pinion meshing with said externally-toothed gear and operatively associated with said second overrunning clutch for driving said outer shaft in a reverse direction relative to said inner shaft responsive to said forward turning of the traction wheel, said overrunning clutches being operative to inactivate said inner and outer shafts responsive to a reverse turning of the traction wheel.

References Cited in the file of this patent

UNITED STATES PATENTS

| | | |
|---|---|---|
| 1,130,283 | Hewett | Mar. 2, 1915 |
| 1,169,002 | Butler | Jan. 18, 1916 |
| 1,465,279 | Montague | Aug. 21, 1923 |
| 2,212,057 | Waller | Aug. 20, 1940 |
| 2,472,972 | Hearn | June 14, 1949 |
| 2,496,327 | Beck | Feb. 7, 1950 |
| 2,496,377 | Cochran | Feb. 7, 1950 |
| 2,598,091 | Ahlgrim | May 27, 1952 |
| 2,691,264 | Miller | Oct. 12, 1954 |
| 2,826,889 | Menge | Mar. 18, 1958 |

FOREIGN PATENTS

| | | |
|---|---|---|
| 496,570 | Great Britain | Nov. 30, 1938 |
| 524,247 | Great Britain | Aug. 1, 1940 |